United States Patent
Kao et al.

(10) Patent No.: US 8,884,911 B2
(45) Date of Patent: Nov. 11, 2014

(54) RESISTIVE TOUCH CONTROLLING SYSTEM AND SENSING METHOD

(75) Inventors: Ming-Tsan Kao, Hsinchu (TW); Shu-Sian Yang, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 582 days.

(21) Appl. No.: 12/888,783

(22) Filed: Sep. 23, 2010

(65) Prior Publication Data

US 2011/0080371 A1    Apr. 7, 2011

Related U.S. Application Data

(60) Provisional application No. 61/249,252, filed on Oct. 6, 2009.

(30) Foreign Application Priority Data

Jun. 15, 2010   (TW) ................................ 99119560 A

(51) Int. Cl.
   *G06F 3/045*    (2006.01)
   *G06F 3/041*    (2006.01)

(52) U.S. Cl.
   CPC ...... *G06F 3/045* (2013.01); *G06F 2203/04104* (2013.01); *G06F 3/0416* (2013.01)
   USPC ....................................................... 345/174

(58) Field of Classification Search
   None
   See application file for complete search history.

(56) References Cited

U.S. PATENT DOCUMENTS

| | | | |
|---|---|---|---|
| 6,498,602 B1 | 12/2002 | Ogawa et al. | |
| 2005/0110772 A1* | 5/2005 | Kong et al. | 345/174 |
| 2008/0122792 A1 | 5/2008 | Izadi et al. | |
| 2009/0085888 A1* | 4/2009 | Ho | 345/174 |
| 2009/0128516 A1* | 5/2009 | Rimon et al. | 345/174 |
| 2009/0189877 A1* | 7/2009 | Washino et al. | 345/174 |
| 2010/0097343 A1* | 4/2010 | Fang | 345/174 |
| 2010/0214231 A1* | 8/2010 | D'Souza et al. | 345/173 |
| 2010/0295816 A1* | 11/2010 | Zhang | 345/174 |
| 2010/0315361 A1 | 12/2010 | Wang et al. | |
| 2010/0321214 A1* | 12/2010 | Wang et al. | 341/20 |
| 2010/0321337 A1 | 12/2010 | Liao et al. | |
| 2012/0154324 A1* | 6/2012 | Wright et al. | 345/174 |
| 2012/0280929 A1 | 11/2012 | Rimon et al. | |

FOREIGN PATENT DOCUMENTS

| | | |
|---|---|---|
| TW | 200402649 A | 2/2004 |
| TW | 201044235 A | 12/2010 |
| TW | 201101134 A | 1/2011 |
| TW | 201106235 A | 2/2011 |
| TW | 201108055 A | 3/2011 |
| TW | 201112065 A | 4/2011 |

* cited by examiner

*Primary Examiner* — Joe H Cheng
*Assistant Examiner* — Kwin Xie
(74) *Attorney, Agent, or Firm* — WPAT, PC; Justin King

(57) ABSTRACT

A resistive touch controlling system includes a first sensing module, a second sensing module and a processing circuit. The first sensing module includes a plurality of sensing line groups. The processing circuit is electrically coupled to the first sensing module and the second sensing modules. When the first sensing module senses at least two touch points, the processing circuit takes a combination of touch points sensed by the first and second sensing modules as a first candidate list. After that, the processing circuit turns off some of the sensing line groups of the first sensing module sensing one of the sensed touch points, and takes a touch point(s) sensed by the first sensing module and the second sensing module as the second candidate list. Finally, the processing circuit compares the first candidate list with the second candidate list to determine a current touch sensing result.

23 Claims, 5 Drawing Sheets

RESISTIVE TOUCH CONTROLLING SYSTEM AND SENSING METHOD

CROSS-REFERENCE TO RELATED APPLICATIONS

This application is based upon and claims the benefit of priority from the prior U.S. Provisional Application No. 61/249,252, filed Oct. 6, 2009, the entire contents of which are incorporated herein by reference.

BACKGROUND

1. Technical Field

The present invention generally relates to resistive touch systems and, particularly to a resistive touch controlling system and sensing method can perform zoning scanning.

2. Description of the Related Art

A resistive touch control screen is a type of most popular touch control technologies, and its driving principle is using a voltage drop to calculate a coordinate. That is, a plurality of X and Y axes each are applied with voltages for driving. When the resistive touch control screen is touched, since a loop is turned on, voltage drops would be correspondingly generated, and a controller would calculate out occupied proportions of the respective voltage drops and then calculate out coordinates.

When the resistive touch control screen is touched or approached, coordinates of a touch point can be determined according to an intersection between an X axis and a Y axis which respectively generate voltage drops. More specifically, when scanning all the X axes, it only can acquire a scanning result of a certain one X axis generating a voltage drop. Similarly, when scanning all the Y axes, it also only can acquire a scanning result of a certain one Y axis generating a voltage drop. Therefore, if wanting to determine the coordinates of the touch point, it is necessary to combine the two scanning results obtained by scanning the X axes and the Y axes.

However, such conventional method would not cause misjudgment in the situation of single touch, but is not suitable for the operating environment of multi touch. Taking two touch points as an example, when coordinates of actual touch points are (X1, Y2) and (Y1 X2), in examining a scanning result of scanning the X axes, it would be found that the X1 axis and the X2 axis generate voltage drops, and in examining a scanning result of scanning the Y axes, it would be found that the Y1 axis and the Y2 axis generate voltage drops. The calculated touch coordinates according to the two scanning results would include (X1, Y1), (X2, Y2), (X2, Y1) and (X1, Y2). Where, only coordinates (X1, Y2) and (X2, Y1) are coordinates of the actual touch points, while the coordinates (X1, Y1) and (X2, Y2) are so-called ghost points and are not the coordinates of actual touch points. Accordingly, an appropriate method to eliminate the existence of ghost points is necessary in the resistive touch controlling system, so as to avoid the occurrence of confusion in determining the coordinates of touch points and causing the failure of coordinate determination.

BRIEF SUMMARY

Accordingly, the present invention is directed to a resistive touch controlling system, which can eliminate the existence of ghost points and therefore correctly determine coordinates of actual touch points.

A resistive touch controlling system in accordance with an embodiment of the present invention includes a first sensing module, a second sensing module and a processing circuit. The first sensing module includes a plurality of sensing line groups. The processing circuit is electrically coupled to the first sensing module and the second sensing module, and when the first sensing module and the second sensing module sense at least two touch points, takes a combination of the touch points sensed by the first sensing module and the second sensing module as a first candidate list. After getting the first candidate list, the processing circuit turns off (or closes) some of the sensing line groups, and takes a touch point(s) sensed by the first sensing module and the second sensing module as the second candidate list. Finally, the first and second candidate lists are compared by the processing circuit to determine a current touch sensing result. It is indicated that, the above-mentioned some of the sensing line groups include the sensing line group of the first sensing module sensing one of the sensed touch points, and a plurality of sensing line groups near such the sensing line group.

In one embodiment of the present invention, when any one of the touch point(s) of the second candidate list and all the touch points of the first candidate list are distant greater than a preset distance, the processing circuit abandons the first and second candidate lists, and generates the current touch sensing result according to the previous touch sensing result. On the contrary, when each touch point of the second candidate list and any one of the touch points of the first candidate list are distant without greater than the preset distance, the processing circuit calculates positions of the two objects according to the touch points of the first candidate list and the touch point of the second candidate list.

In one embodiment of the present invention, when continuous results of touch sensing show that the two objects are at sliding, the processing circuit determines a linear distance between the two objects whether is less than a minimum distance threshold value. If the linear distance is less than the minimum distance threshold value, the processing circuit calculates latest positions of the two objects according to voltage distributions of the sensing line groups obtained from scanning the first and second sensing modules. Wherein, the latest positions of the two objects can be calculated out by a proportion computation according to the voltage distributions of the sensing line groups.

In another embodiment of the present invention, when continuous results of touch sensing show that the two objects are at sliding, the processing circuit determines a slope variation of a line connecting the two objects whether is less than a preset variation value. If the slope variation is less than the preset variation value, the processing circuit further determines a linear distance between the two objects whether is progressively increased or decreased. If the linear distance between the two objects is progressively increased, the processing circuit enables the resistive touch controlling system to perform a zoom in operation. Whereas, if the linear distance between the two objects is progressively decreased, the processing circuit enables the resistive touch controlling system to perform a zoom out operation.

In another embodiment of the present invention, when continuous results of touch sensing show that the two objects are at sliding, the processing circuit determines an intersection angle between a line connecting the two objects and a preset axis whether is greater than a preset angle. If the intersection angle is greater than the preset angle, the processing circuit enables the resistive touch controlling system to perform an image rotation operation.

A resistive touch controlling system in accordance with another embodiment of the present invention includes a touch panel, a first sensing module and a processing circuit. The first sensing module includes a plurality of sensing line groups, and each of the sensing line groups is corresponding to a first sensing area of the touch panel. The processing circuit is electrically coupled to the first sensing module to scan the plurality of sensing line groups of the first sensing module one by one. Two of the successively scanned sensing line groups of the first sensing module are not positionally adjacent with each other. When scanning an Xth sensing line group of the first sensing module and sensing being touched by an object, the processing circuit scans a plurality of preceding and succeeding sensing line groups of the Xth sensing line group one by one to determine which of the first sensing areas the object exists.

A resistive touch sensing method in accordance with still another embodiment of the present invention is adapted to a resistive touch controlling system including a first sensing module and a touch panel. The first sensing module includes a plurality of sensing line groups and each of the sensing line groups corresponds to a first sensing area of the touch panel. The resistive touch sensing method firstly scans the sensing line groups of the first sensing module one by one, and two of the successively scanned sensing line groups are not positionally adjacent with each other. When scanning an Xth sensing line group of the first sensing module and sensing being touched by an object, a plurality of preceding and succeeding sensing line groups of the Xth sensing line group one by one is scanned to determine the first sensing area where the object exists.

In the various embodiments of the present invention, when getting touch information of multiple touched points by scanning, some of sensing line groups related to at least one touched point are turned off (or closed), and at this time, a second scanning is performed and then the scanning results are compared, so that it is available to create a single touch environment in a very short period of time and hereby can determine actual touch points and eliminate the influence of the ghost point. In addition, nonadjacent scanning line scanning mode used in some embodiments of the present invention can have a probability to accelerate the detection of touch points and shorten the whole scanning time.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

In the following detailed description of the preferred embodiments, reference is made to the accompanying drawings which form a part hereof, and in which are shown by way of illustration specific embodiments in which the invention may be practiced. It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Accordingly, the descriptions will be regarded as illustrative in nature and not as restrictive.

Figure 1:
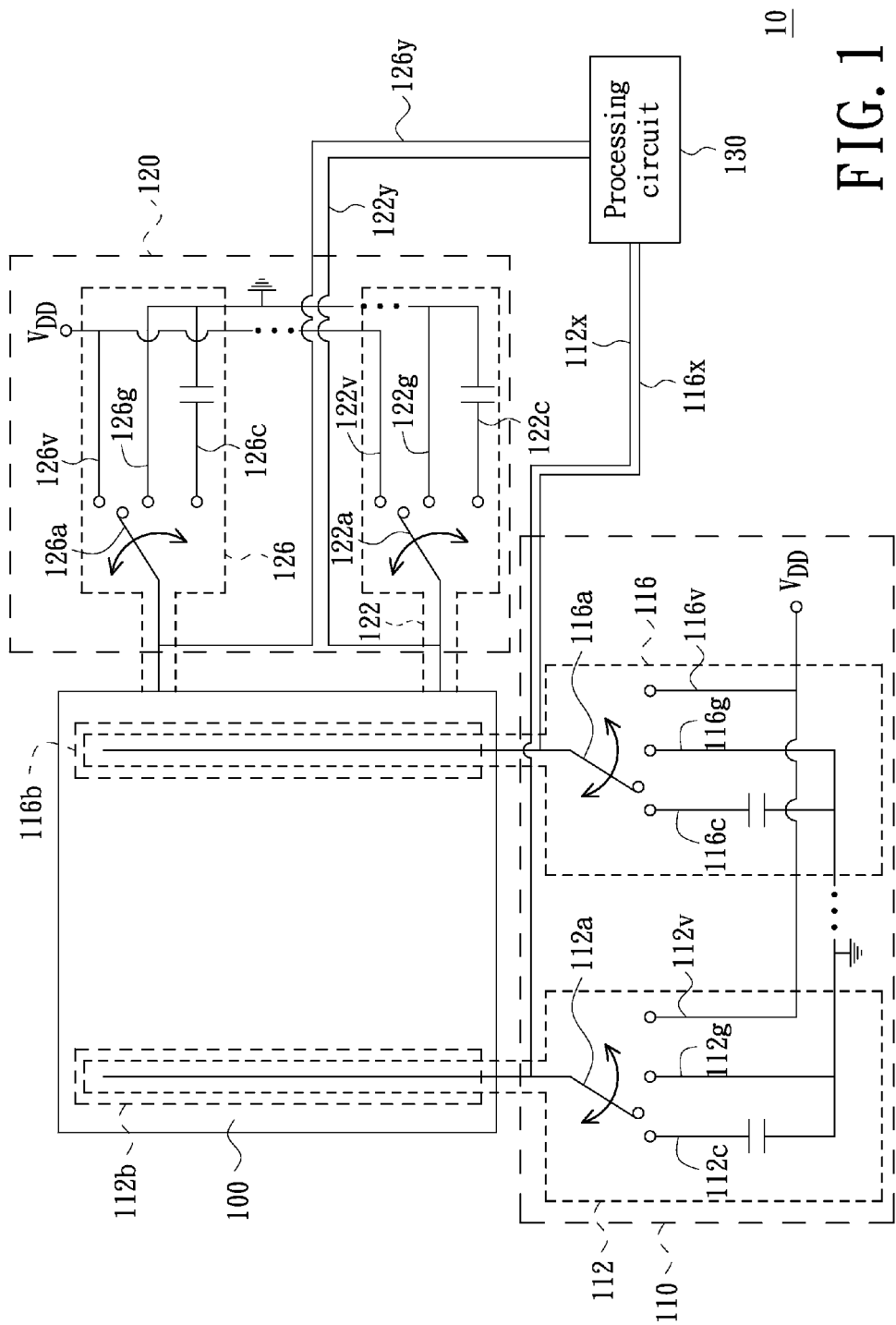
FIG. 1 shows a schematic circuit block diagram of an exemplary embodiment of a resistive touch controlling system.

Referring to FIG. 1, showing a schematic circuit block diagram of a resistive touch controlling system in accordance with an exemplary embodiment of the present invention. The resistive touch controlling system 10 includes a touch panel 100, a first sensing module 110, a second sensing module 120 and a processing circuit 130. However, the touch panel 100 is not a necessary component of the resistive touch controlling system 10. In other words, the resistive touch controlling system 10 can only include the circuits of the first sensing module 110, the second sensing module 120, the processing circuit 130 and so on, for generating touch sensing signals and processing these sensing signals.

In the embodiment as illustrated in FIG. 1, the first sensing module 110 and the second sensing module 120 include a plurality of sensing line groups such as sensing line groups 112, 116, 122, and 126. Each of the sensing line groups (e.g., the sensing line groups 112, 116, 122, and 126) includes a switch (e.g., the switch 112a, 116a, 122a, or 126a), a capacitor line (e.g., the capacitor line 112c, 116c, 122c, or 126c), a grounding line (e.g., the grounding line 112g, 116g, 122g, or 126g), and an input voltage level line (e.g., the input voltage level line 112v, 116v, 122v, or 126v). The capacitor line is further electrically coupled to a capacitor, the grounding line is further electrically coupled to a grounding voltage, and the input voltage level line is further electrically coupled to an input voltage VDD. The processing circuit 130 is electrically coupled to the first sensing module 110 and the second sensing module 120 respectively through lines 112x, 116x, 122y and 126y etc., and determines whether there is an object touching a corresponding sensing line group 112, 116, 122, or 126 according to the voltage obtained from the lines 112x, 116x, 122y, and 126y.

Generally speaking, before scanning whether there is an object touching the touch panel 100, the sensing line groups of the first sensing module 110 would be electrically coupled to the input voltage VDD, and the sensing line groups of the second sensing module 120 would be electrically coupled to the grounding voltage. When scanning the first sensing module 110, the sensing line groups (112, 116) would be electrically coupled to the corresponding capacitor lines (112c, 116c) in a manner of one by one, and the sensing line groups of the second sensing module 120 maintains at being electrically coupled to the grounding voltage. At this situation, the processing circuit 130 can detect the voltage level change of the corresponding sensing line group 112 through the line 112x, and determines whether there is an object touching the sensing area 112b corresponding to the sensing line group 112 of the touch panel 100 according to the detected voltage level change. Similarly, the processing circuit 130 also can detect a voltage level change of a corresponding sensing line group 116 through the line 116x, and determines whether there is an object touching the sensing area 116b corresponding to the sensing line group 116 of the touch panel 100 according to the detected voltage level change.

Similarly, when scanning the second sensing module 120, the operation mode is the same as the above-mentioned operation mode, and relevant description will not be repeated herein.

Figure 2A:
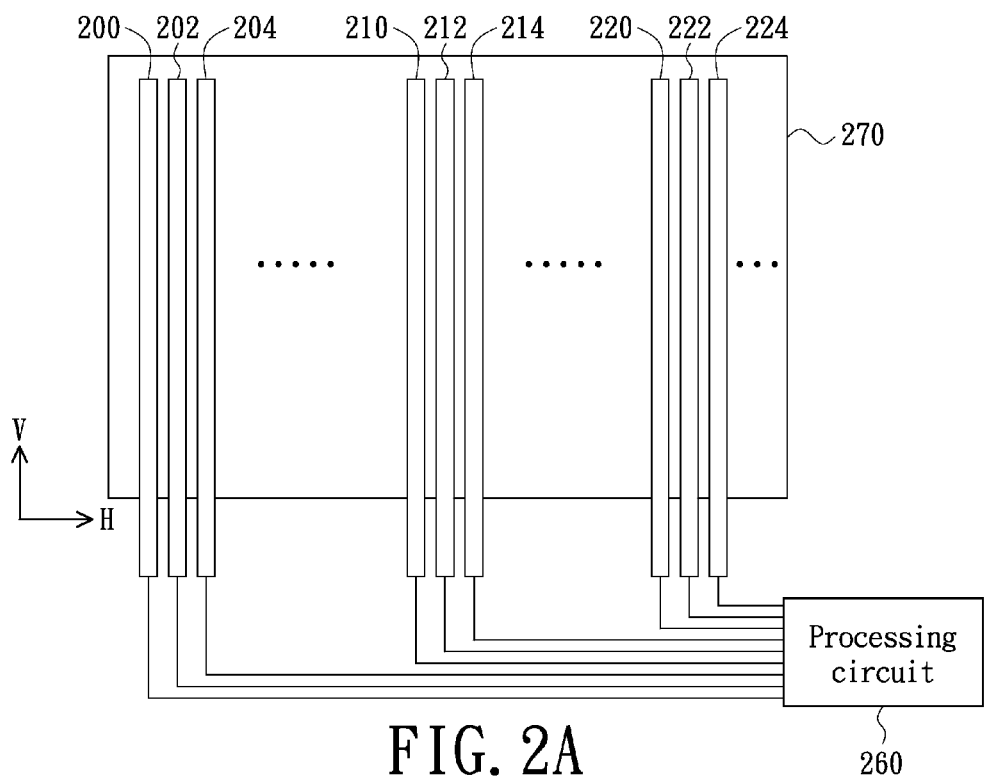
FIGS. 2A and 2B show schematic views of arrangement of sensing line groups in accordance with an exemplary embodiment.
Figure 2B:
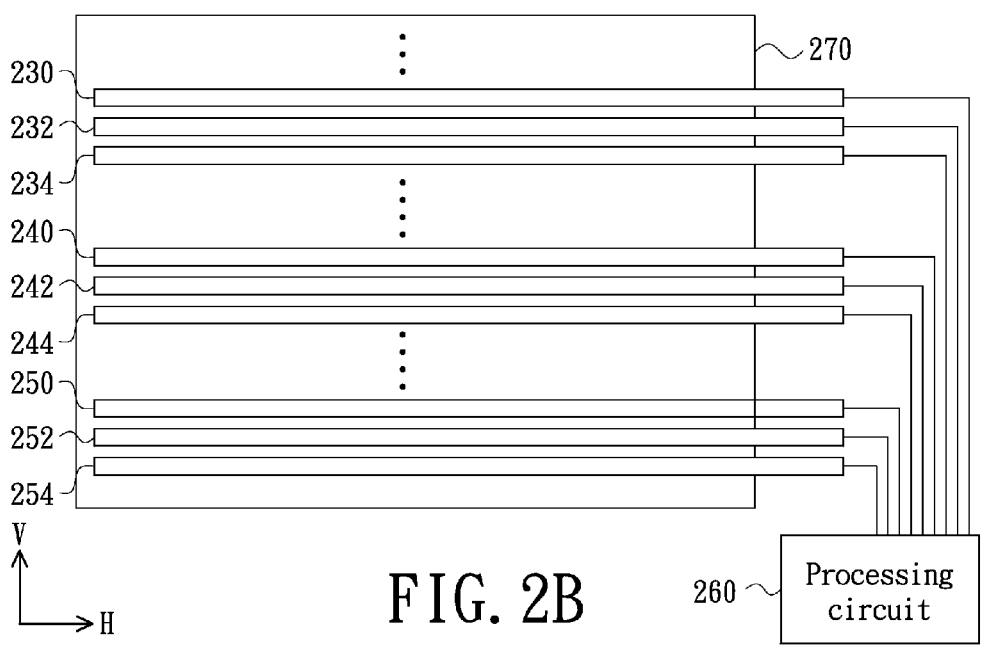

Subsequently, referring to FIG. 2A and FIG. 2B together, showing a schematic view of arrangement of sensing line groups in accordance with an embodiment of the invention. As shown in FIG. 2A, the sensing line groups 200-224 are arranged along a horizontal direction and vertically extending into the touch panel 270. Similarly, as shown in FIG. 2B, the sensing line groups 230~254 are arranged along the vertical direction and horizontally extending into the touch panel 270. Each of these sensing line groups corresponds to a sensing area (not shown) on the touch panel 270, as the same illustrated in FIG. 1. When scanning the sensing line groups arranged along a certain one direction, voltage levels of the sensing line groups must be sensed one by one. However, a scanning sequence of the sensing line groups can be changed. For example, when scanning the sensing line groups 200-224 horizontally arranged, a sequential scanning method generally is used. That is, the sensing line group 200 is firstly scanned, next the sensing line groups 202, 204 . . . 210, 212, 214 . . . 220, 222, until 224 are scanned. A non-sequential scanning (e.g., interlacing scanning) method can be used instead, for example, the sensing line group 202 is firstly scanned, next the sensing line group 212 is scanned, and then the sensing line group 222 is scanned; once there is an object touching possibility on one of the sensing line groups possibly touched by an object (e.g., voltage changes in the sensing line group 212), other sensing line groups near this sensing line group will be further scanned (e.g., the sensing line groups 210, 214, etc.), so as to determine a sensing area where the object exists according to a sensed peak voltage. Similarly, when scanning the sensing line groups 230~254 vertically arranged, any one of the above-mentioned methods can be used.

Figure 3:
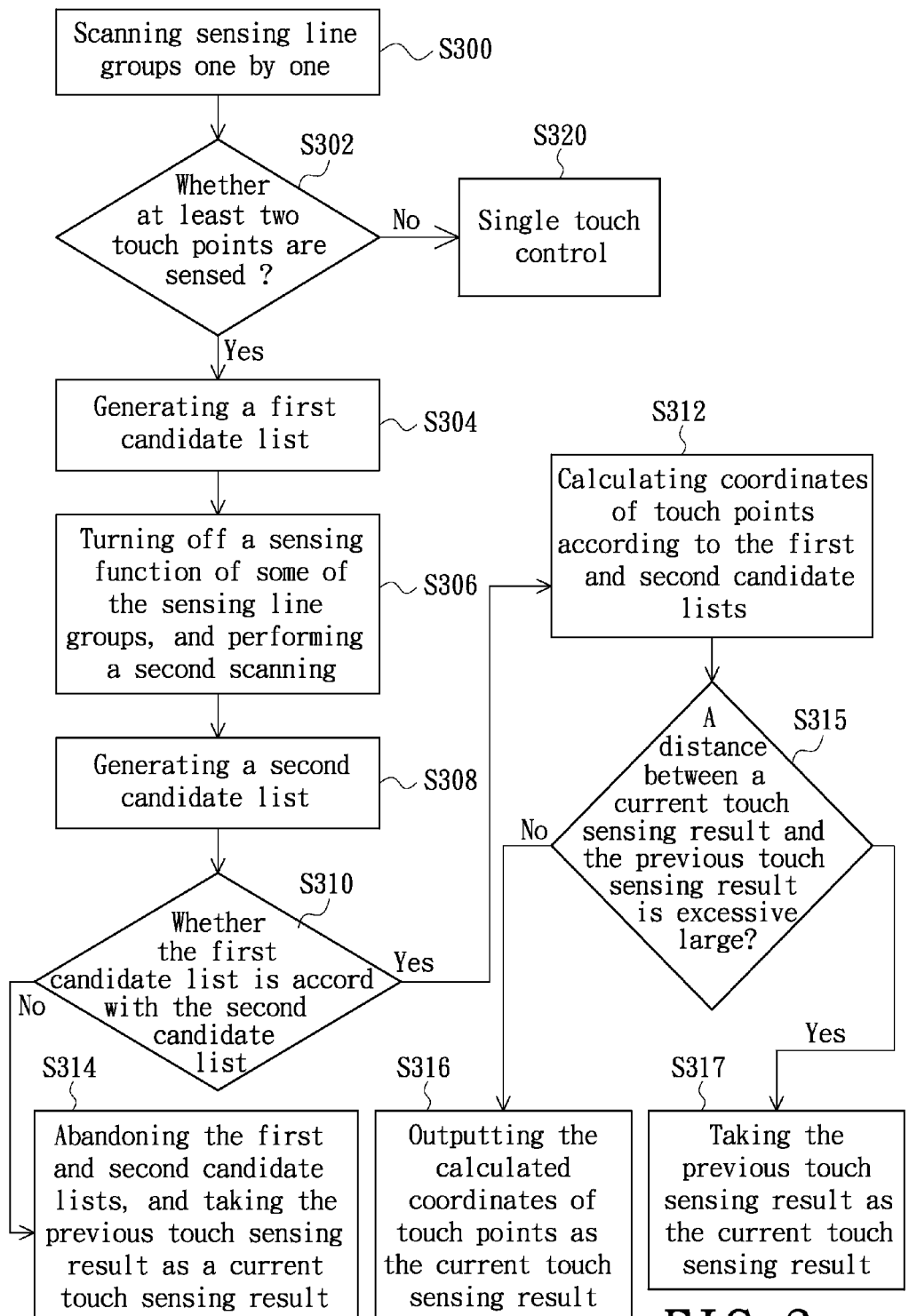
FIG. 3 shows a flow chart of a resistive touch sensing method in accordance with an exemplary embodiment.

Referring to FIG. 3, showing a flow chart of a resistive touch sensing method in accordance with an embodiment of the present invention. In this embodiment, the sensing line groups 200~224 or 230~254 are scanned one by one using any one of the above-mentioned methods (step S300). Judging whether at least two touch points exist (i.e., are sensed) after finishing scanning (step S302). If only one touch point exists, single touch control is performed according to a general operation method (step S320). If at least two touch points exist, the processing circuit 260 combines positions of the sensing line groups where touch points exist to generate the first candidate list with positional coordinates of the many/multiple touch points (step S304).

After the first candidate list is generated, the processing circuit 260 will close a sensing function of some of the sensing line groups in a sensing module of a certain direction, and then perform a second scanning in this situation (step S306). Specifically, if the sensing line groups 200~224 as shown in FIG. 2A sense that an object touch point exists in each of the sensing line groups 202 and 222. The processing circuit 260 can choose one of the sensing line groups and turn it off, or select many sensing line groups related to one of the object touch points and turn them off, or turn off/close most of the sensing line groups, and then perform the second scanning. In other words, in the above-mentioned situation, the processing circuit 260 can only turn off the sensing line group 202 where peak voltage exists, or turn off many sensing line groups whose voltages change and near the sensing line group 202, or turn off the right side sensing line groups 200-212, or even only keep the sensing function of the sensing line group 222 while turn off the sensing function of the remained sensing line groups. After the above-mentioned turning off operations for the sensing line groups, some of the touch points of the first candidate list will be excluded by the second scanning, and a touch point(s) obtained by the second scanning is/are listed in a second candidate list for the use of subsequent processing (step S308).

In order to achieve the goal of turning off a sensing function of a certain sensing line group(s), this embodiment uses the architecture as shown in FIG. 1 for the convenience of description. Referring to FIG. 1, when needs to turn off the sensing function of the sensing line group 112, the switch 112a may switch to a voltage level same as the voltage level connected with the switches 122a and 126a. For example, when performing a normal sensing operation the switches 112a and 116a may respectively be electrically coupled to the input voltage level lines 112v and 116v, and the switches 122a and 126a may respectively be electrically coupled to the ground lines 122g and 126g. When turning off the sensing function of the sensing line group 112, the switch 112a can be electrically coupled to the grounding line 112g, thereby achieving the goal of turning off the sensing function of the sensing line group 112.

Referring to FIG. 2A, FIG. 2B and FIG. 3 together, after generating the second candidate list in step S308, the processing circuit 260 compares contents of the first and second candidate lists to determine whether the first candidate list is accorded with the second candidate list (step S310). If the first candidate list is accorded with the second candidate list, coordinates of the touch points are calculated according to the first and second candidate lists (step S312). Whereas, if the first candidate list is not accorded with the second candidate list, there are several methods will be described as follows. One method is to directly abandon the first and second candidate lists and take the previous touch sensing result as a current touch sensing result (step S314). Another method is to perform a third scanning, calculate coordinates of the touch points according to the sensing result of the third scanning and coordinates of the touch points of the first and second candidate lists, determine which one group of images has a minimum sum of coordinate movement displacement according to the calculation result, and define the two images having the minimum sum of coordinate movement displacement as continuous images. That is, the determined two images are defined to be a reasonable movement result.

In still another embodiment, after calculating the coordinates of the touch points according to the first and second candidate lists in step S312, coordinates of the touch points (or termed as the current touch sensing result) are compared with the previous touch sensing result to determine a distance between corresponding touch points of the two touch sensing results whether is excessive large (e.g., greater than a preset distance) (step S315). If the distance is not greater than the preset distance, the calculated coordinates of the touch points in step S312 are outputted as the current touch sensing result (step 316). Whereas, if the distance is greater than the preset distance, the previous touch sensing result is taken as the current touch sensing result (step S317).

It is noted that, so-called candidate lists being accorded with each other does not mean that there necessarily are touch points with same coordinates respectively in the two candidate lists, and it needs to judge/determine whether there is a touch point listed in the second candidate list is in a preset distance range in the vicinity of the touch points in the first candidate list. For example, a sliding of object generally has its regularity, so that during the sliding movement of the object, as long as a time interval between two scannings is regulated, a movement distance between the two scannings of most of objects would be less than the above-mentioned preset distance. However, assuming that an object just is lifted and then dropped down, or has been moved to the part where the sensing line groups are closed between the first and second scannings, it is difficult to determine correct coordinates of touch points because of excessive distance change between the first candidate list and the second candidate list.

In another embodiment, when a distance between the previous and latter images is excessive large, defining that a coordinate weight of the touch point in the latter image is less than the coordinate weight of the touch point in the previous image. When the distance between the previous and latter images is smaller, defining that a coordinate weight of the touch point in the latter image is greater than the coordinate weight of the touch point in the previous image. Or, their weights can be changed along a trajectory curve of approximate 45 degree or along a movement trace on the diagonal direction of a screen, that is, higher weights are given to recorded historical coordinates in previous times while lower weights are given to current coordinates, thereby maintaining a smooth curve and inhibiting the occurrence of wavy trajectory.

Figure 4:
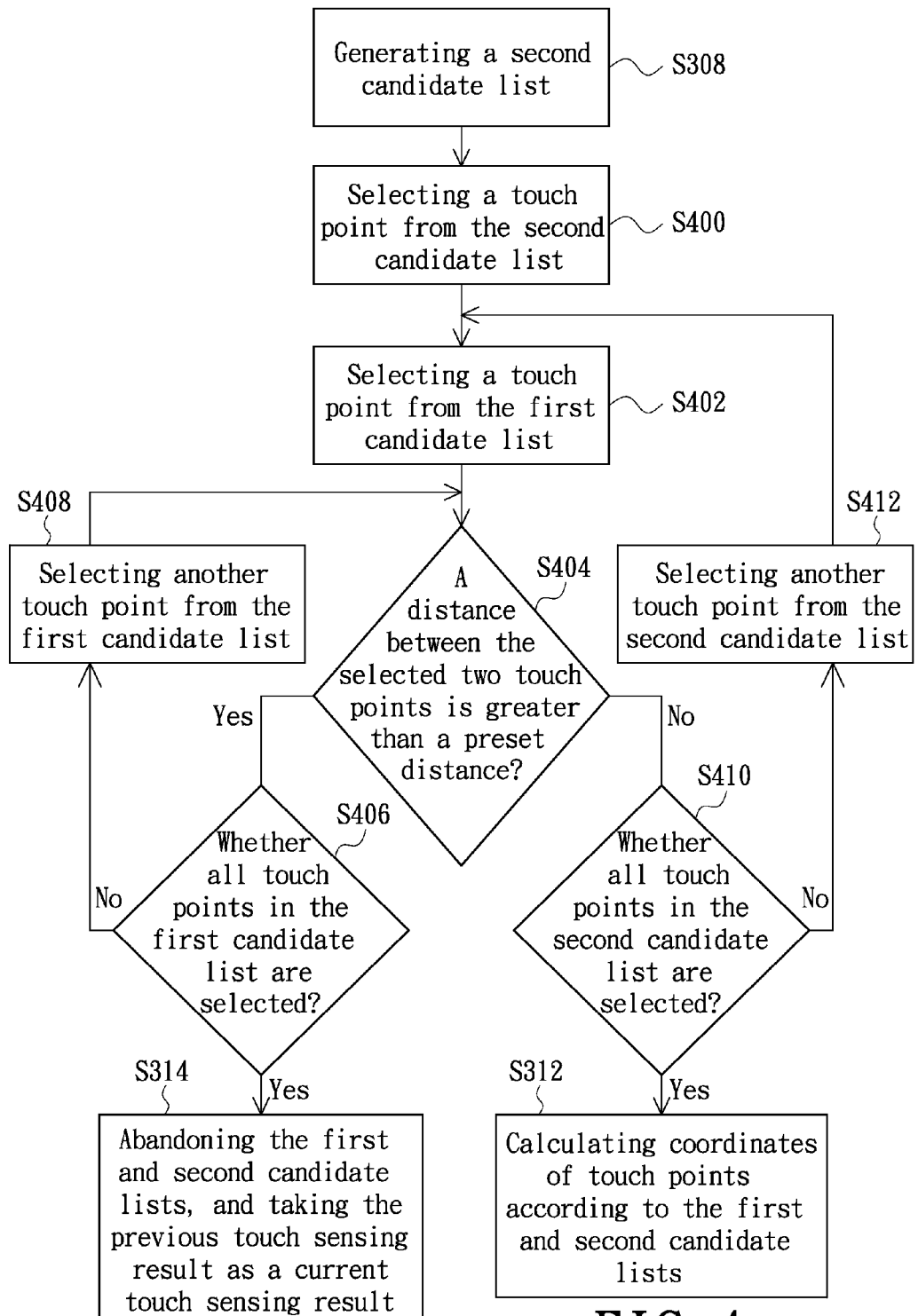
FIG. 4 shows an implementation step flow chart in accordance with an exemplary embodiment when determining whether a first candidate list is accorded with a second candidate list.

Referring to FIG. 2A, FIG. 2B, and FIG. 4 together, FIG. 4 shows an implementation step flow chart in accordance with an exemplary embodiment when determining whether a first candidate list is accorded with a second candidate list. In this embodiment, after generating the second candidate list from step S308, a touch point is selected from each of the first candidate list and the second candidate list (steps S400 and S402). Next, the processing circuit 260 of FIG. 2A and FIG. 2B calculates the distance between the selected two touch points respectively from the first and second candidate lists, and determines the distance between the selected two touch points whether is greater than a preset distance (step S404).

If the determination result of the step S404 is "Yes", the procedure goes to step S406. In step S406, the processing circuit 260 determines whether all of the touch points in the first candidate list are selected to perform distance calculations with the selected touch point in the second candidate list. If the determination result of the step S406 is "No", another touch point is selected from the first candidate list (step S408) and another distance calculation is performed to the selected another touch point and the selected touch point from the second candidate list (step S404). On the contrary, if the determination result of the step S406 is "Yes", it indicates that there is one (or any) touch point of the second candidate list and all the touch points of the first candidate list are distant greater than the preset distance, the procedure goes to step S314 to abandon the first and second candidate lists and generate a current touch sensing result according to the previous touch sensing result. It is noted that, the step S406 going to the step S314 only is for the purpose of matching with the embodiment as illustrated in FIG. 3. It is understood to the skilled person in the art that, the step S314 can be implemented with other behavior, such as another kind of touch result generating method alternative with the above-mentioned step S314 or other touch result generating methods.

If the determination result of the step S404 is "No", the procedure goes to step S410. In step S410, the processing circuit 260 determines whether all the touch point(s) in the second candidate list is/are selected to perform the distance calculation with the selected touch point in the first candidate list. If the determination result of the step S410 is "No", another touch point is selected from the second candidate list (step S412) and another distance calculation is performed to the selected another touch point and the selected touch point from the first candidate list (step S404). On the contrary, if the determination result of the step S410 is "Yes", it indicates that each of the touch points of the second candidate list and any one of the touch points of the first candidate point are distant without greater than the preset distance, the procedure then goes to step S312 to calculate the positions of the two objects according to the touch points of the first and second candidate lists.

It is noted that, in the steps S400-S412 as shown in FIG. 4, if the first and second candidate lists are exchanged, the resistive touch controlling system can also normally operate/run.

Figure 5:
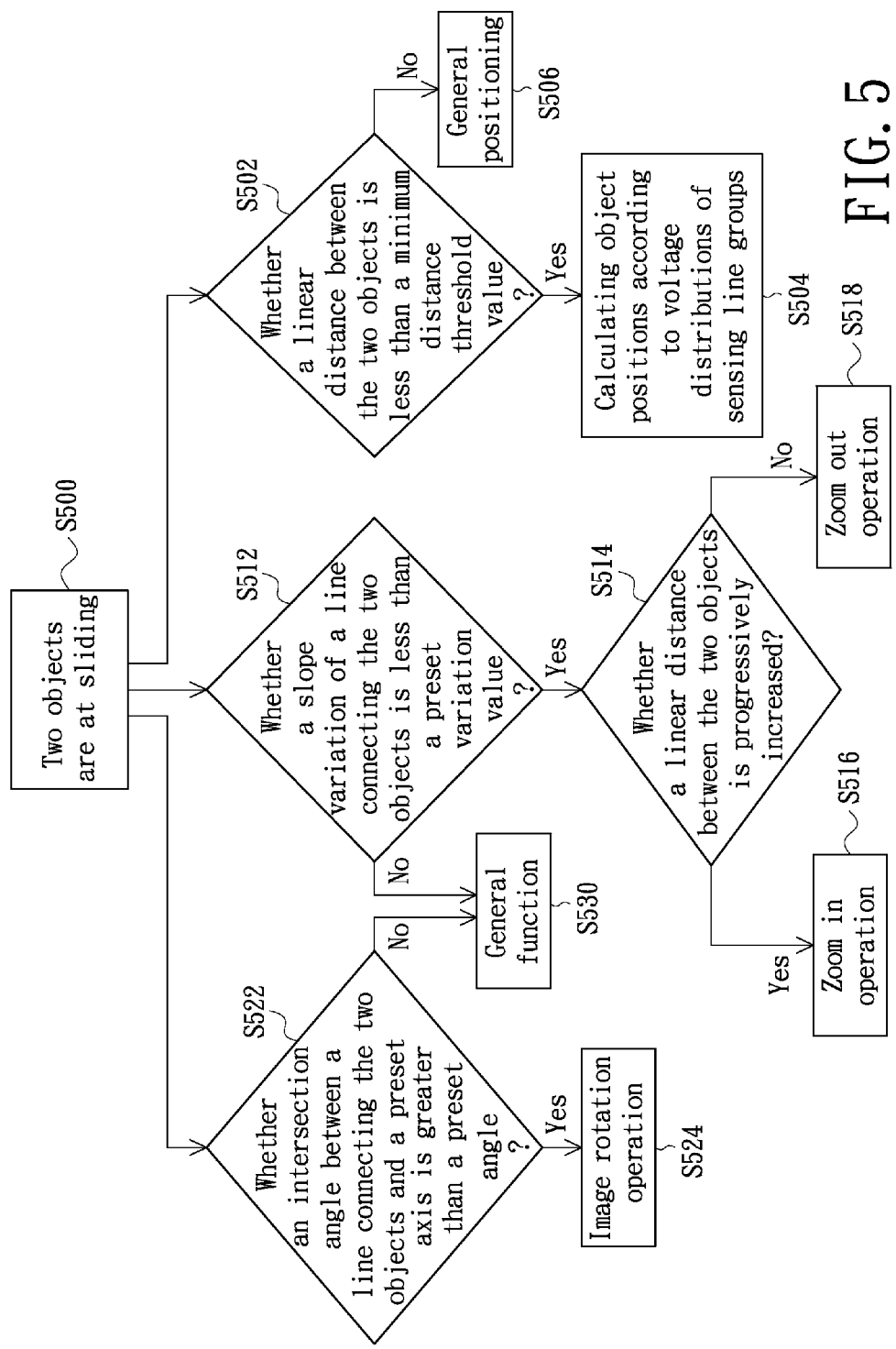
FIG. 5 shows a flow chart of other positioning and operating methods in accordance with an exemplary embodiment.

In addition to the above-mentioned sensing methods, the resistive touch controlling system in accordance with the present invention can further provide other positioning and operating methods. Referring to FIG. 5, showing a flow chart of the other positioning and operating methods according to an embodiment of the present invention. As shown in FIG. 5, after continuous many times of touch sensing, when the touch sensing results obtained using the foregoing or other methods shows that the two objects on the resistive touch controlling system are at sliding (step S500), the resistive touch controlling system (or above-mentioned processing circuit included in the resistive touch controlling system) will select various positioning or operating methods defined in steps S502, S512, S522 and subsequent steps.

When the two objects are at sliding, the resistive touch controlling system can further determine a linear distance between the two objects whether is less than a minimum distance threshold value (step S502). If the linear distance between the two objects is not less than the minimum distance threshold value, it indicates that a positional interval of the two objects is enough to distinguish the two touch points, and therefore can use a general positioning method to locate coordinates of the touch points (step S506). If the linear distance between the two objects is less than the minimum distance threshold value, it indicates that the two objects are too close and the two touch points might be not clearly distinguished, in this situation, positions of the objects can be calculated according to voltage distributions of the sensing line groups obtained from several continuous times of scanning (step S504).

Specifically, when the two objects are sliding to be close, and it can be found from the detected sensing line group voltages that positions of the two peak voltages will gradually be close to each other and finally combine into one peak voltage (i.e., the two objects are close to be distinguished). At this time, a proportion computation can be performed using the voltage distributions of the sensing line groups to calculate the latest object positions. The proportion computation is to use the information of the two peak voltages before being combined with each other to calculate the proportion of them according to relationships between the peak voltages and respective areas in a final data of the two peak voltages just before being combined with each other and then use the calculated out proportion to decompose the combined peak voltage. For example, before being combined, a proportion of a left-sided peak voltage area to a right-sided peak voltage area is 10:1. The 10/11 of the combined peak voltage area on the left is set as a new left peak voltage, and the 1/11 of the combined peak voltage area on the right is set as a new right peak voltage. Centers of the touch points can also be determined according to the above calculated proportion. For example, in the above-mentioned embodiment, a new left peak voltage position can be obtained by calculating a center or a center of gravity of the 10/11 of the combined peak voltage area on the left, a new right peak voltage position can be obtained by calculating a center or a center of gravity of the 1/11 of the combined peak voltage area on the right, and finally the new left peak voltage position and the new right peak voltage position are taken as coordinates of the two touch points Referring to FIG. 5, when the two objects are at sliding, the resistive touch controlling system can further determine a slope variation of a line connecting the two objects whether is less than a preset variation value (step S512). If the slope variation is not less than the preset variation value, the resistive touch controlling system performs a general function (step S530). If the slope variation is less than the preset variation value, the resistive touch controlling system determines a linear distance between the two objects whether is progressively increased or decreased (step S514). If the determination result shows that the linear distance between the two objects is progressively increased, the processing circuit 130 enables the resistive touch controlling system to perform a zoom in operation (steps S516). On the contrary, if the determination result shows that the linear distance between two objects is progressively decreased, the processing circuit 130 enables the resistive touch controlling system to perform a zoom out operation (step S518).

FIG. 5 also shows that when the two objects are at sliding, the resistive touch controlling system can further determine an intersection angle between a line connecting the two objects and a preset axis whether is greater than a preset angle (step S522). If the intersection angle is not greater than the preset angle, the processing circuit 130 enables the resistive touch controlling system to perform a general function (step S530). Whereas, if the intersection angle is greater than the preset angle, the processing circuit 130 enables the resistive touch controlling system to perform an image rotation operation (step S524).

It is noted that, the preset axis mentioned in the step S522 can be a horizontal axis H or a perpendicular axis V as shown in FIG. 2A and FIG. 2B, and can also be any preset axis direction. Moreover, in another embodiment, during scanning the sensing line groups to obtain sensing voltages, if a sensed peak voltage is less than a certain scale of a maximum peak voltage, the small voltage is treated as an interference signal and a change of the small voltage is ignored. In addition, when the number of touch points in a current image is less than the number of touch points in the previous image, the previous image data can be temporary retained, and when the numbers of touch points in many subsequent images all are less than the number of the touch points of the previous image, the previous image data is abandoned and the latest image data is outputted.

In summary, in the resistive touch controlling system and sensing method of the present invention, the consistency of the previous and latter scanning results are confirmed, so that the touch point coordinates can be accurately determined and the possibility of coordinate determination failure can be reduced.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A resistive touch controlling system, comprising:
a first sensing module, comprising a plurality of sensing line groups, wherein each sensing line group corresponds to a specific sensing area on a resistive touch screen of the resistive touch controlling system;
a second sensing module; and
a processing circuit, being electrically coupled to the first sensing module and the second sensing module, and when at least a first object and a second object touch the resistive touch controlling system to cause the first sensing module sensing at least two touch points, for taking a combination of touch points sensed by the first sensing module and the second sensing modules as a first candidate list, thereafter for activating a switch to couple some of the sensing line groups of the first sensing module sensing one of the sensed touch points to ground and for taking a touch point(s) sensed by the first sensing module and the second sensing module at this situation as a second candidate list, and then for comparing the first candidate list with the second candidate list to determine a current touch sensing result.

2. The resistive touch controlling system as claimed in claim 1, wherein when any one of the touch point(s) of the second candidate list and the touch points of the first candidate list are distant greater than a preset distance, the processing circuit abandons the first candidate list and the second candidate list.

3. The resistive touch controlling system as claimed in claim 2, wherein after abandoning the first candidate list and the second candidate list, the processing circuit generates the current touch sensing result according to the previous touch sensing result.

4. The resistive touch controlling system as claimed in claim 1, wherein when each touch point of the second candidate list and any one of the touch points of the first candidate list are distant without greater than a preset distance, the processing circuit calculates positions of the two objects according to the touch point of the second candidate list and the touch points of the first candidate list.

5. The resistive touch controlling system as claimed in claim 1, wherein when continuous results of touch sensing show that the two objects are at sliding, the processing circuit determines whether a linear distance between the two objects is less than a minimum distance threshold value.

6. The resistive touch controlling system as claimed in claim 5, wherein when the linear distance is less than the minimum distance threshold value, the processing circuit calculates latest positions of the two objects according to voltage distributions of the sensing line groups obtained from scanning the first sensing module and the second sensing module.

7. The resistive touch controlling system as claimed in claim 6, wherein the processing circuit performs a proportion computation using the voltage distributions of the sensing line groups to calculate the latest positions of the two objects.

8. The resistive touch controlling system as claimed in claim 1, wherein when continuous results of touch sensing show that the two objects are at sliding, the processing circuit determines a slope variation of a line connecting the two objects whether is less than a preset variation value.

9. The resistive touch controlling system as claimed in claim 8, wherein when the processing circuit determines the slope variation is less than the preset variation value, the processing circuit further determines a linear distance between the two objects whether is progressively increased or decreased.

10. The resistive touch controlling system as claimed in claim 9, wherein when the linear distance between the two objects is progressively increased, the processing circuit enables the resistive touch controlling system to perform a zoom in operation.

11. The resistive touch controlling system as claimed in claim 9, wherein when the linear distance between the two objects is progressively decreased, the processing circuit enables the resistive touch controlling system to perform a zoom out operation.

12. The resistive touch controlling system as claimed in claim 1, wherein when continuous results of touch sensing show that the two objects are at sliding, the processing circuit determines an intersection angle between a line connecting the two objects and a preset axis whether is greater than a preset angle.

13. The resistive touch controlling system as claimed in claim 12, wherein when the intersection angle is greater than the preset angle, the processing circuit enables the resistive touch controlling system to perform an image rotation operation.

14. The resistive touch controlling system as claimed in claim 12, the preset axis is a horizontal axis or a perpendicular axis.

15. The resistive touch controlling system as claimed in claim 1, wherein the processing circuit chooses a combination of the touch points from the first candidate list according to the second candidate list as the current touch sensing result.

16. The resistive touch controlling system as claimed in claim 1, wherein the processing circuit further compares the current touch sensing result with the previous touch sensing result, and when acquiring the two touch sensing results have distances greater than a preset distance, takes the previous touch sensing result as the current touch sensing result.

17. A resistive touch sensing method, adapted to a resistive touch controlling system comprising a first sensing module and a touch panel, wherein the first sensing module comprises a plurality of sensing line groups and each of the sensing line groups of the first sensing module is corresponding to a first sensing area of the touch panel, the resistive touch sensing method comprising:
  scanning the sensing line groups of the first sensing module one by one, wherein two of the successively scanned sensing line groups of the first sensing module are not positionally adjacent with each other; and
  when scanning an Xth sensing line group of the first sensing module and sensing being touched by an object, scanning a plurality of preceding and succeeding sensing line groups of the Xth sensing line group one by one to determine the first sensing area where the object exists,
  wherein the preceding and succeeding sensing line groups of the Xth sensing line group are aligned in the same direction as the Xth sensing line group.

18. The resistive touch sensing method as claimed in claim 17, wherein the resistive touch controlling system further comprises a second sensing module comprising a plurality of sensing line groups, and each of the sensing line groups of the second sensing module being corresponding to a second sensing area of the touch panel, the resistive touch sensing method further comprising:
  after determining the first sensing area where the object exists, determining the second sensing area where the object exists using the second sensing module.

19. The resistive touch sensing method as claimed in claim 18, wherein the step of determining the second sensing area where the object exists using the second sensing module comprises:
  scanning the sensing line groups of the second sensing module one by one, wherein two of the successively scanned sensing line groups of the second sensing module are not positionally adjacent with each other; and
  when scanning an Yth sensing line group of the second sensing module and sensing being touched by the object, scanning a plurality of preceding and succeeding sensing line groups of the Yth sensing line group one by one to determine the second sensing area where the object exists.

20. The touch sensing method as claimed in claim 17, wherein the step of when scanning the Xth sensing line group of the first sensing module and sensing being touched by the object, scanning the plurality of preceding and succeeding sensing line groups of the Xth sensing line group one by one to determine the first sensing area where the object exists comprises:
  when scanning the Xth sensing line group of the first sensing module and sensing being touched by the object, scanning a plurality of sensing line groups of a second sensing module one by one, wherein two of the successively scanned sensing line groups of the second sensing module are not positionally adjacent with each other; and
  when scanning a Yth sensing line group of the second sensing module and sensing being touched by the object, scanning a plurality of preceding and succeeding sensing line groups of the Xth sensing line group one by one to determine the first sensing area where the object exists, and scanning a plurality of preceding and succeeding sensing line groups of the Yth sensing line group one by one to determine the second sensing area where the object exists.

21. A resistive touch controlling system, comprising:
  a touch panel;
  a first sensing module comprising a plurality of sensing line groups, and each of the sensing line groups of the first sensing module being corresponding to a first sensing area of the touch panel; and
  a processing circuit, being electrically coupled to the first sensing module to scan the plurality of sensing line groups of the first sensing module one by one, wherein two of the successively scanned sensing line groups of the first sensing module are not positionally adjacent with each other, and after scanning a Xth sensing line group of the first sensing module and sensing being touched by an object, scanning a plurality of preceding and succeeding sensing line groups of the Xth sensing line group one by one to determine the first sensing area where the object exists,
  wherein the preceding and succeeding sensing line groups of the Xth sensing line group are aligned in the same direction as the Xth sensing line group.

22. The resistive touch controlling system as claimed in claim 21, further comprising: a second sensing module, comprising a plurality of sensing line groups, and each of the sensing line groups of the second module being corresponding to a second sensing area of the touch panel.

23. The resistive touch controlling system as claimed in claim 22, wherein the processing circuit is electrically coupled to the second sensing module to scan the sensing line groups of the second sensing module, and two of the successively scanned sensing line groups of the second sensing module are not positionally adjacent with each other, and after scanning a Yth sensing line group of the second sensing module and sensing being touched by the object, scans a plurality of preceding and succeeding sensing line groups of the Yth sensing line group one by one to determine the second sensing area where the object exists.

* * * * *